United States Patent
Gerdes et al.

(10) Patent No.: US 11,811,344 B2
(45) Date of Patent: Nov. 7, 2023

(54) SYSTEM AND METHOD OF OVERCOMING A DEAD-BAND IN A SWITCHED RELUCTANCE MOTOR

(71) Applicant: Caterpillar Inc., Peoria, IL (US)

(72) Inventors: Jesse R. Gerdes, Dunlap, IL (US); Thomas M. Sopko, Washington, IL (US); Carlos E. Nino Baron, Edwards, IL (US); Jackson Wai, Dunlap, IL (US); Ahmed Khalil, Dunlap, IL (US); Sajan Abdul, Dunlap, IL (US); Amara Ashfaq, Dunlap, IL (US); James Michael Thorne, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 420 days.

(21) Appl. No.: 17/132,076

(22) Filed: Dec. 23, 2020

(65) Prior Publication Data

US 2022/0200501 A1    Jun. 23, 2022

(51) Int. Cl.
*B60L 15/20*   (2006.01)
*H02P 23/30*   (2016.01)
(Continued)

(52) U.S. Cl.
CPC ............... *H02P 23/30* (2016.02); *E02F 9/207* (2013.01); *E02F 3/7609* (2013.01); *E02F 3/841* (2013.01); *E02F 9/02* (2013.01)

(58) Field of Classification Search
CPC .......... B60L 15/20; B60L 50/16; H02P 23/30; E02F 9/207; E02F 3/7609; E02F 3/841; E02F 9/02
See application file for complete search history.

(56) References Cited

U.S. PATENT DOCUMENTS

| 10,079,566 B1 | 9/2018 | Khalil et al. |
| 2005/0072608 A1 | 4/2005 | Johnston |

(Continued)

FOREIGN PATENT DOCUMENTS

| GB | 2576480 B | 2/2021 |
| JP | H08119132 A | 5/1996 |

OTHER PUBLICATIONS

Anonymous: "inverter=Why the triangle reference wave is used in PWM for sine modulation?—Electrical Engineering Stack Exchange", Mar. 20, 2020 (Mar. 20, 2020), pp. 1-6, XP055903859, Retrieved from the Internet: URL:https://electronics.stackexchange.com/questions/487213/why-the-triangle-reference-wave-is-used-in-pwm-for-sine-modulation [retrieved on Mar. 22, 2022] paragraph [0003].

(Continued)

*Primary Examiner* — Cortez M Cook (57) ABSTRACT

A work machine includes a frame, a traction system supporting the frame, a power source mounted on the frame, a switched reluctance motor, an inverter configured to control power to the motor from a power source, and a controller. The controller is configured to receive a signal indicating a desired torque and determine if the desired torque is between an upper threshold and a lower threshold. If the desired torque is between the upper threshold and the lower threshold, pulse width modulation is used to produce a PWM adjusted torque command, and the motor is commanded based on the PWM adjusted torque command. The PWM adjusted torque command is configured to cycle between the upper threshold and the lower threshold to produce the desired torque.

18 Claims, 6 Drawing Sheets

(51) Int. Cl.
    *E02F 9/20*     (2006.01)
    *E02F 3/76*     (2006.01)
    *E02F 3/84*     (2006.01)
    *E02F 9/02*     (2006.01)

(56) References Cited

U.S. PATENT DOCUMENTS

| | | | |
|---|---|---|---|
| 2007/0216323 A1* | 9/2007 | Ishikawa | B60L 50/16 318/9 |
| 2010/0072925 A1* | 3/2010 | Itoh | B60L 50/50 318/400.02 |
| 2012/0130576 A1* | 5/2012 | Sugiyama | B60L 15/00 903/903 |
| 2014/0265975 A1* | 9/2014 | Holmes | B60L 15/20 318/452 |
| 2018/0183363 A1 | 6/2018 | Sakamoto | |
| 2020/0067433 A1 | 2/2020 | Khalil et al. | |

OTHER PUBLICATIONS

Written Opinion and International Search Report for Int'l. Patent Appln. No. PCT/US2021/063177, dated Apr. 13, 2022 (13 pgs).

\* cited by examiner

SYSTEM AND METHOD OF OVERCOMING A DEAD-BAND IN A SWITCHED RELUCTANCE MOTOR

TECHNICAL FIELD

The present disclosure relates generally to electric motors and generators, and more specifically to switched reluctance machines.

BACKGROUND

Many work machines such track-type tractors, excavators, and the like may include a transmission coupled to a power source to enable the work machine to be repositioned or travel between locations. With increased interest in energy conservation and avoidance of use of fossil fuels, use of electric motors as that power source is becoming more common. Electric motors convert electrical energy from an energy source such as a battery into mechanical power to drive the work machine.

One type of electric motor known as a switched reluctance motors is widely used for various applications such as the above work machine due to its rugged and robust construction. A switched reluctance motor includes a rotor and a plurality of stators. Unlike common brushed DC motor types, power is delivered to windings in the stator rather than the rotor. This greatly simplifies mechanical design as power does not have to be delivered to a moving part, but it complicates the electrical design as some sort of switching system needs to be used to deliver power to the different windings. Some switched reluctance motors have a control system with sensor-less operation which estimate the position and speed of a rotor relative to a stator without the use of a direct position sensor. Sensor-less operation is important in many applications due to the need for minimum package size, high reliability and low cost. Proper determination of the position of the rotor at rest or at low speeds is vital to the performance and efficiency of the motor.

One such sensor-less control system is described in U.S. Pat. No. 10,079,566. However, at low loads, there may not be sufficient current to the stators to estimate the position of the rotor, creating a minimum torque. Therefore, there remains a need for a control system for a switched reluctance motor which provides sensor-less operation when low torque is required.

SUMMARY OF THE DISCLOSURE

According to one aspect of the present disclosure, a work machine is disclosed. The work machine includes a frame; a traction system supporting the frame; a power source mounted on the frame; a switched reluctance motor; an inverter configured to control power to the motor from a power source; and a controller. The controller is configured to receive a signal indicating a desired torque and determine if the desired torque is between an upper threshold and a lower threshold. If the desired torque is between the upper threshold and the lower threshold, pulse width modulation is used to produce a PWM adjusted torque command, and the motor is commanded based on the PWM adjusted torque command. The PWM adjusted torque command is configured to cycle between the upper threshold and the lower threshold to produce the desired torque.

According to another aspect of the present disclosure, an electric drive system is disclosed. The system includes a switched reluctance motor; an inverter configured to control power to the motor from a power source; and a controller. The controller is configured to receive a signal indicating a desired torque and determine if the desired torque is between an upper threshold and a lower threshold. If the desired torque is between the upper threshold and the lower threshold, pulse width modulation is used to produce a PWM adjusted torque command, and the motor is commanded based on the PWM adjusted torque command. The PWM adjusted torque command is configured to cycle between the upper threshold and the lower threshold to produce the desired torque.

According to yet another aspect of the present disclosure, a method of overcoming a dead-band in a switched reluctance motor is disclosed. The method includes receiving a signal indicating a desired torque and determining if the desired torque is between an upper threshold and a lower threshold. If the desired torque is between the upper threshold and the lower threshold, pulse width modulation is used to produce a PWM adjusted torque command, and the motor is commanded based on the PWM adjusted torque command. The PWM adjusted torque command is configured to cycle between the upper threshold and the lower threshold to produce the desired torque.

These and other aspects and features of the present disclosure will be more readily understood after reading the following detailed description in conjunction with the accompanying drawings.

DETAILED DESCRIPTION

This disclosure relates to a switched reluctance motor control system and method of deploying same. The switched reluctance motor control system has wide applicability to any work machine utilizing such a switched reluctance motor control system. Referring now to the drawing and with specific reference to FIG. 1, an exemplary work machine 100 that includes a switched reluctance motor control system is shown. The work machine 100 is shown as a track-type tractor but may include any type of work machine that includes a switched reluctance motor and control system.

Figure 1:
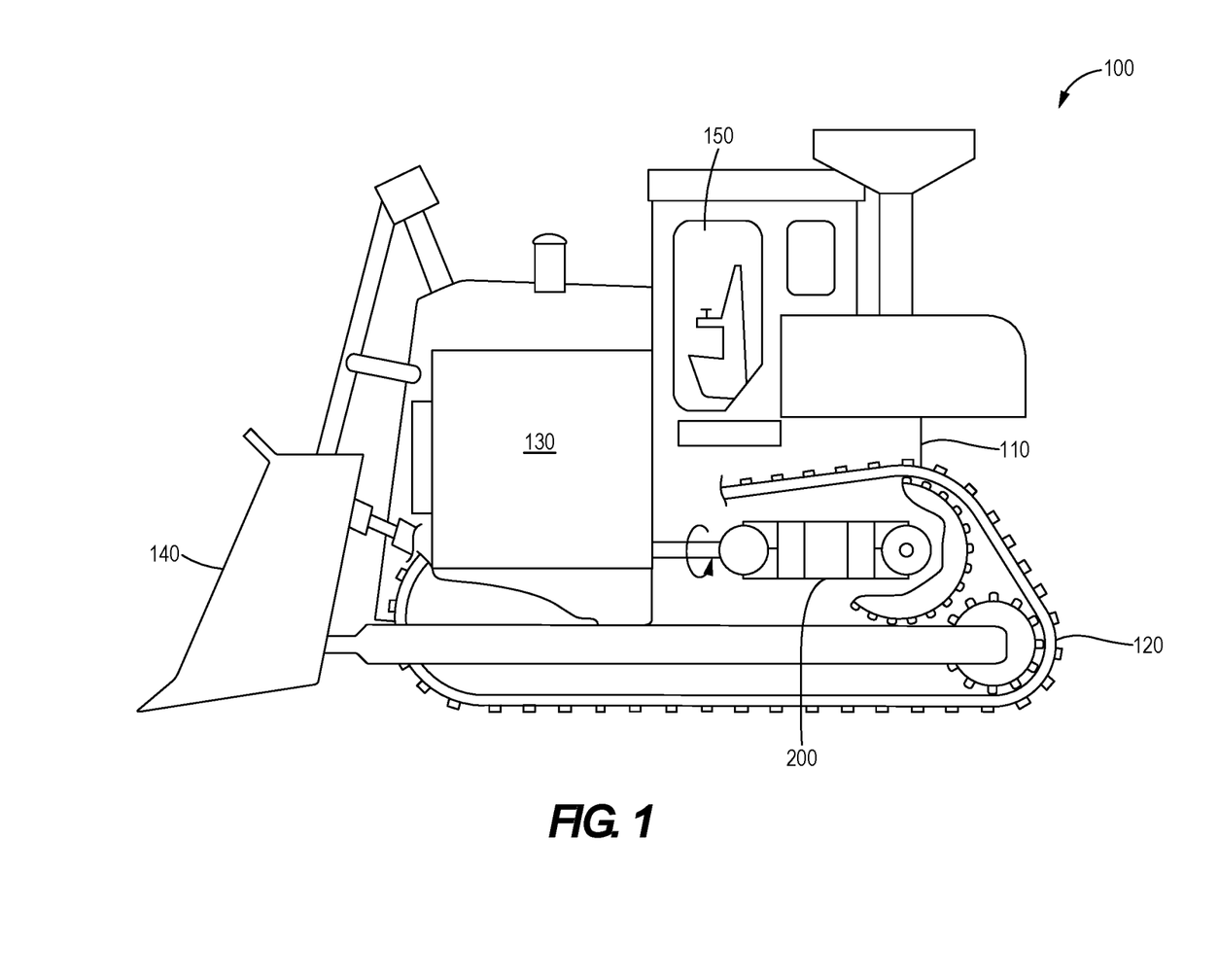
FIG. 1 is a side view of a work machine, according to one aspect of the present disclosure.

As shown, the work machine 100 includes a frame 110, a traction system 120 supporting the frame 110, a power source 130 supported on the frame 110, and an electric drive system 200 configured to transfer energy from the power source 130 to the traction system 120. An implement 140, such as but not limited to a bucket as illustrated, may be attached to the frame 1110 and may be powered by the electric drive system 220. The work machine 100 may also include an operator cab 150. The power source 130 is configured to supply power to the work machine 100 and provide operating power for the propulsion of the electric drive system 200. The power source 130 may be a direct current (DC) power source, an Otto cycle or Diesel cycle engine, or the like. The power source 130 may be operably arranged to receive control signals from operator controls (not shown) in the operator cab 150. Additionally, the power source 130 may be operably arranged to power other systems of the work machine 100.

The electric drive system 200 may be operably arranged with the power source 130 to selectively propel the work machine 100 via control signals from an operator in the operator cab 150. The electric drive system 200 is operably connected to the traction system 120, which may be movably connected to the work machine 100 through axles, drive shafts, a transmission, and/or other components. In some implementations, the traction system 120 may be provided in the form of a track-drive system as shown, although a wheel-drive system, or any other type of drive system configured to engage the ground and propel the work machine 100 are possible as well.

In some implementations, the electric drive system 200 may additionally or alternatively be configured to selectively operate the implement 140, which may be movably connected to the work machine 100 and to the electric drive system 200. The illustrated implement 154 is a blade mount on a work machine 100 in the form of a tractor loader, but of course, other embodiments can include any other suitable implement for a variety of tasks, such as, but not limited to, dozing, brushing, compacting, mining, grading, lifting, ripping, plowing, or the like.

As indicated above, FIG. 1 is provided as an example of a work machine 100 that may utilize the switched reluctance motor and control system of the present disclosure. Other examples are possible and may differ from what was described in connection with FIG. 1.

Figure 2:
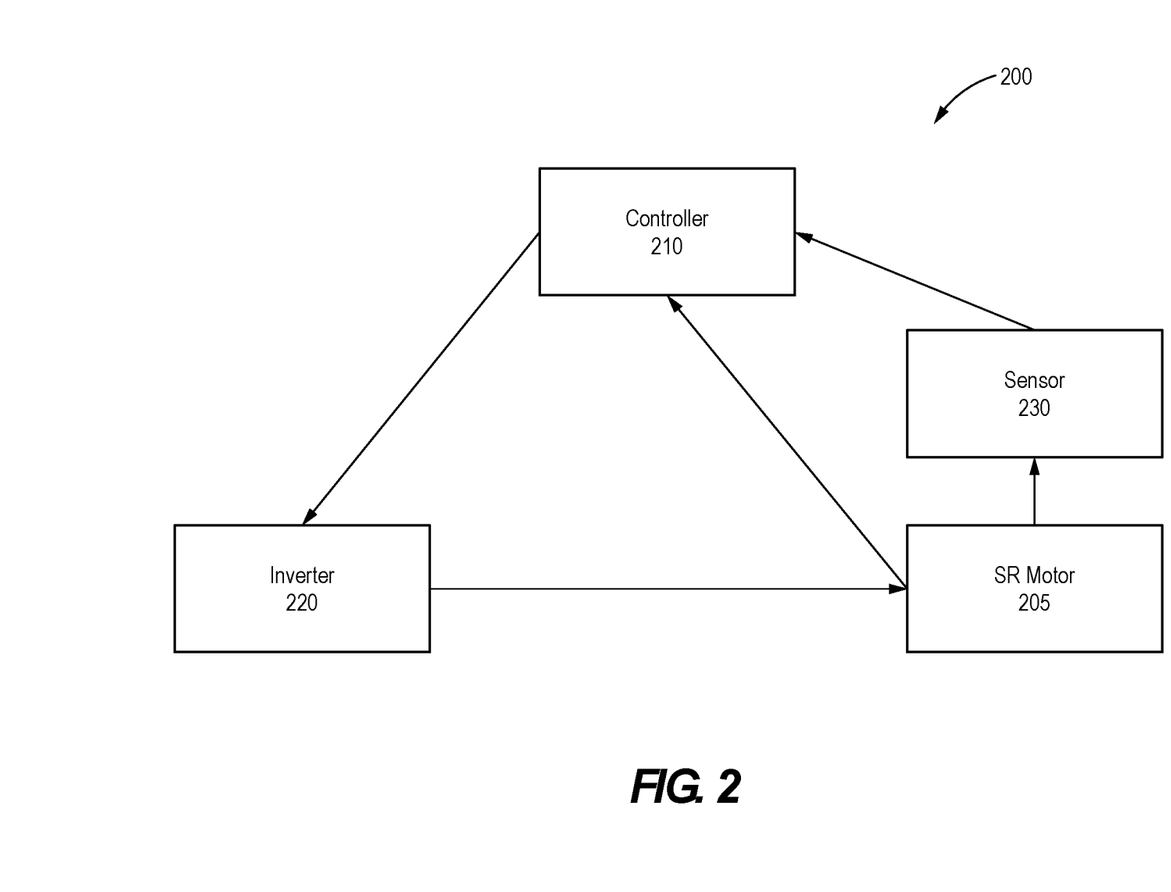
FIG. 2 is a block diagram of an electric drive system useable on the work machine of FIG. 1, according to one aspect of the present disclosure.

As shown in FIG. 2, the electric drive system 200 includes a motor 205, a controller 210, an inverter 220, and a current sensor 230. The motor 205 is a switched reluctance (SR) motor, as shown in FIG. 3 and described in more detail below.

The controller 210 is configured to receive inputs from the sensor 230, an operator, and/or other systems of the work machine 100. Based on those inputs, the controller 210 commands the inverter 220 to provide power to the SR motor 205 as required. This includes priming commands at start-up, switching commands during operation, and other commands as required for the application as will be described herein.

The inverter 220 is electrically connected to the power source 130 and the motor 205. The inverter 220 provides current to the SR motor 205 as commanded by the controller 210. In some implementations, the inverter 220 may receive a DC current from the power source 130 and may control a phase of the DC current to provide an AC current to the SR motor 205. The current sensor 230 monitors current in the SR motor 205 and communicates information to the controller 210 about the current in each of several phases of the SR motor 205.

Figure 3:
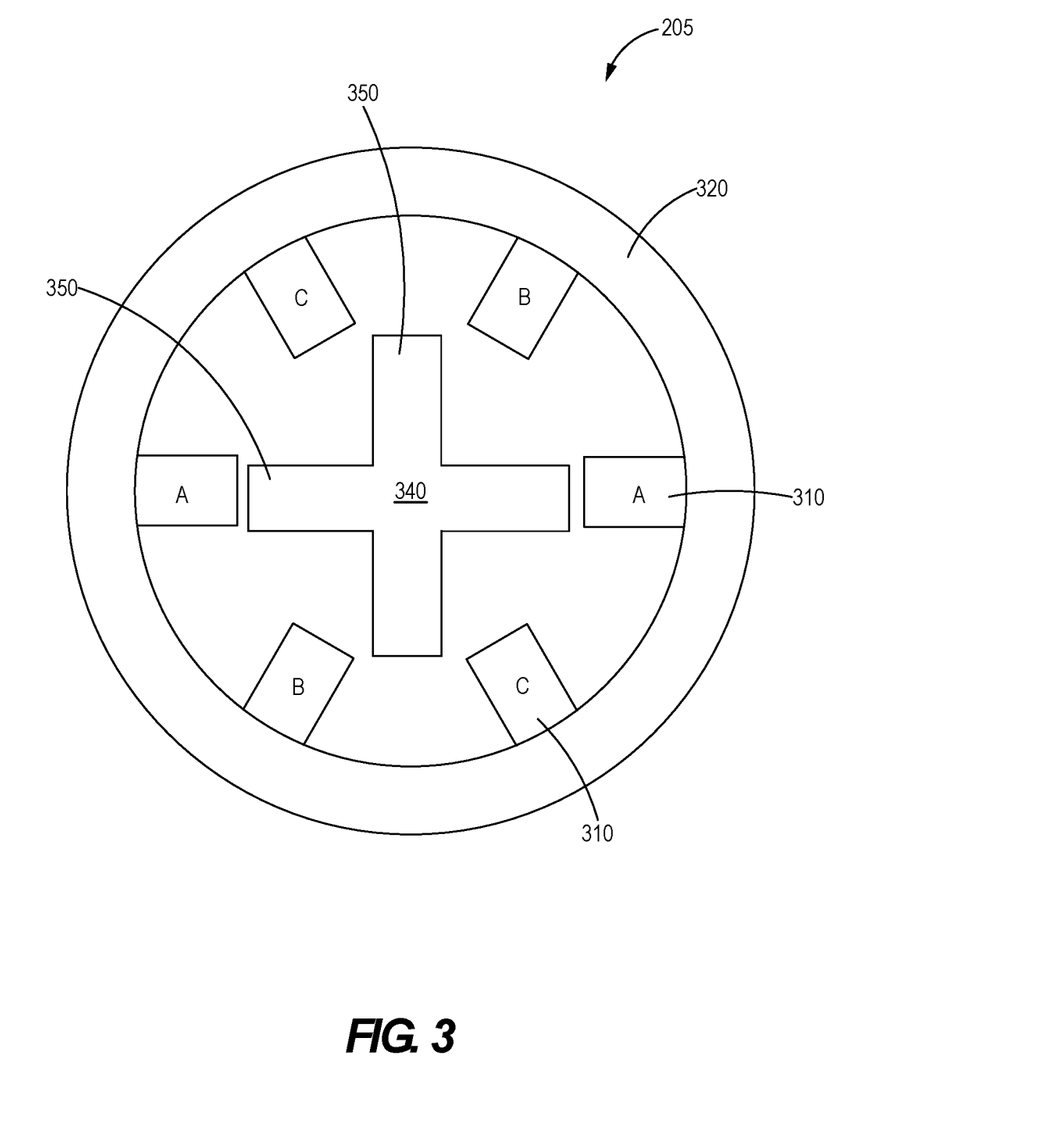
FIG. 3 is a cross-sectional view of a switched reluctance motor, according to one aspect of the present disclosure.

One example of a SR motor 205 is shown in cross-section in FIG. 3. The SR motor 205 includes a stator 320 with a plurality of stator teeth 310. The stator teeth 310 are provided in pairs positioned on opposite sides of the stator, referenced as A, B, and C in FIG. 3. Unlike brushed DC motor types, power is delivered to the stators 310 rather than the rotor 340. This greatly simplifies mechanical design as power does not have to be delivered to a moving part, but it complicates the electrical design as some sort of switching system needs to be used to deliver power to the different stators 310 in turn.

Each stator tooth 310 has a winding (not shown) which allows that stator tooth 310 to be energized. Each stator tooth 310 may be energized as a different phase. Within the center of the stator 320 is a rotor 340 with a plurality of rotor poles 350, also arranged as pairs. The illustrated example has six stator teeth 310 and four rotor poles 350, but other numbers of stator teeth 310 and rotor poles 350 are possible.

The SR motor 205 operates on the tendency of the rotor 340 to move to a position where the reluctance with respect to the stator 320 is minimized. This position of minimized reluctance occurs where a pair of rotor poles 350 is aligned with a pair of energized stator teeth 310. This magnetic attraction produces a torque causing the rotor 340 to rotate and move towards the minimized reluctance position. As power is delivered to each pair of stator teeth 310 and the rotor 340 moves into alignment therewith, the next stator teeth 310 in sequence are then energized to continue the movement of the rotor 340 and maintain angular momentum. This pattern of switching which stator teeth 310 are energized and which are not, along with which phase, complicates operation of such motors. Proper operation of the motor 310 is dependent on the proper timing at which each stator tooth 310 is energized. That timing is driven by the angular position of the rotor 340 relative to the stator 320.

Although some SR motors 205 in the art use sensors to detect the position of the rotor poles 350 relative to the stator 320, sensor-less operation is important for various applications due to the need for minimum package size, high reliability and low cost for SR motors. Reliable and accurate position sensing for switched reluctance motors is a key step towards developing low-cost, high-performance SR work machine drives.

One way of estimating rotor 340 position involves injecting a triangular current pulse into one or more idle phases of the stator 310. A stator current flowing through the idle phases is then estimated using an observer-based estimation approach. The controller 310 compares the estimated stator current with an actual stator current received from the current sensor to generate an error signal. The error signal is used to compute an estimated position of the rotor and an estimated speed of the rotor.

However, this method of sensor-less operation requires a minimum current to the motor. At very low torque loads, the current required may be too low for the process of injection, measurement and comparison to correctly function, creating a dead-band in which the controller cannot determine the position of the rotor.

The present disclosure therefore proposes to overcome the dead-band by further configuring the controller to apply pulse width modulation when the dead-band occurs. The same disclosure may also be applied to other dead-bands in electric machines, including, but not limited to, SR generators, SR motors with position sensors, induction motors, permanent magnet motors, and other electric machines including motors or generators.

Figure 4:
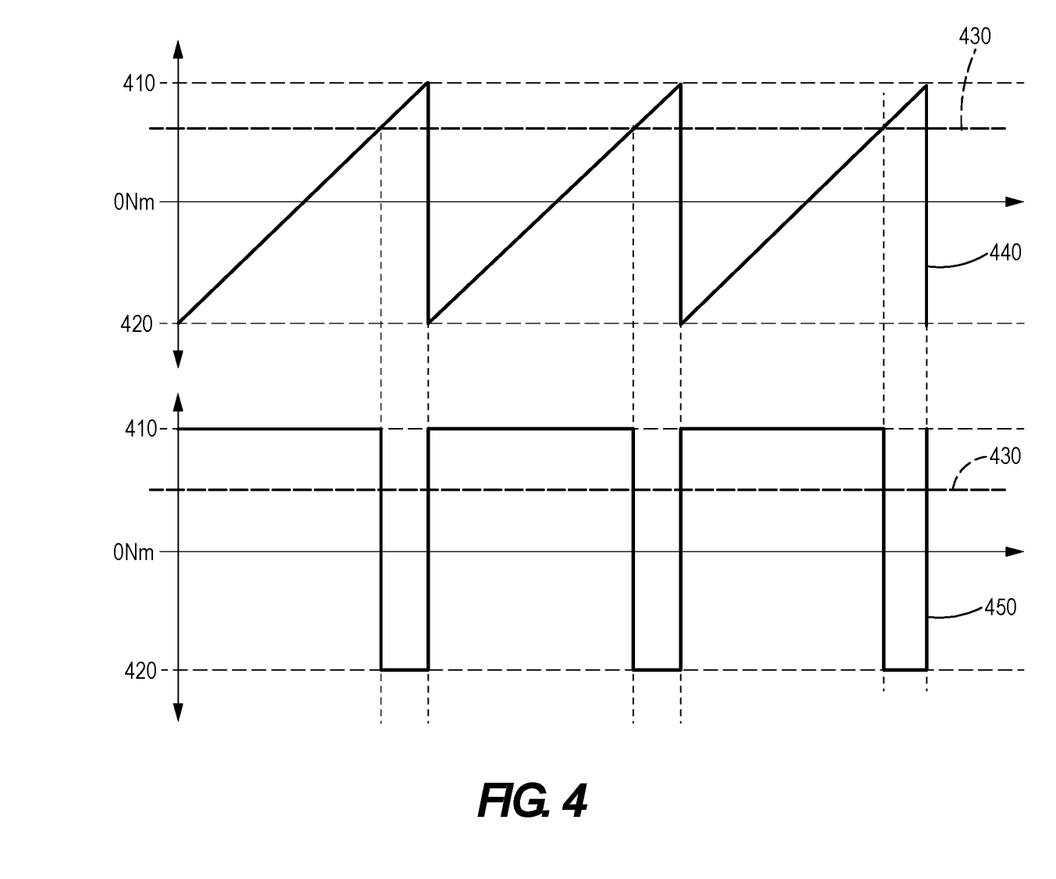
FIG. 4 is a chart depicting a pulse width modulation, according to one aspect of the present disclosure.

To overcome the dead-band, the controller must first determine if the amount of torque required is between an upper threshold 410 and a lower threshold 420 corresponding to the positive and negative torque loads which produce the minimum current required for sensor-less operation. In some embodiments, the upper threshold 410 may be 250 N·m and the lower threshold 420 may be −250 N·m, but of course, the specific thresholds depend on the application.

If the needed torque or "desired torque command 430" is not between the thresholds 410, 420, the controller will command the inverter as normal to produce the desired torque.

On the other hand, if the desired torque command 430 is between the thresholds 410, 420, the controller will then apply pulse width modulation PWM to produce a PWM adjusted torque command 450. PWM is a method of reducing the average power delivered by an electrical signal, by effectively chopping it up into discrete parts. This allows a current outside the dead-band limits to be used while the motor produces the desired torque 430.

As can be seen in FIG. 4, the PWM adjusted torque command 450 may be produced by generating a PWM reference signal 440 and comparing that signal to the desired torque 430. The PWM reference signal 440 may be a sawtooth or triangle wave, and oscillate between the upper threshold 410 and the lower threshold 420. The frequency of the reference signal must be faster than the mechanics of the SR motor 205 can respond, but not so fast as to interfere with the position sensing. In some embodiments, the frequency may be 250 Hz, 500 Hz, or any other frequency suitable to the specific application. Different frequencies may be used by the same system under different conditions.

When the PWM reference signal 440 is less than the desired torque 430, the PWM adjusted torque command 450 is equal to the upper threshold 410. When the PWM reference signal 440 is greater than the desired torque 430, the PWM adjusted torque command 450 is equal to the lower threshold 420. The PWM adjusted torque command 450 produces the same torque from the SR motor as the desired torque 450.

Figure 5:
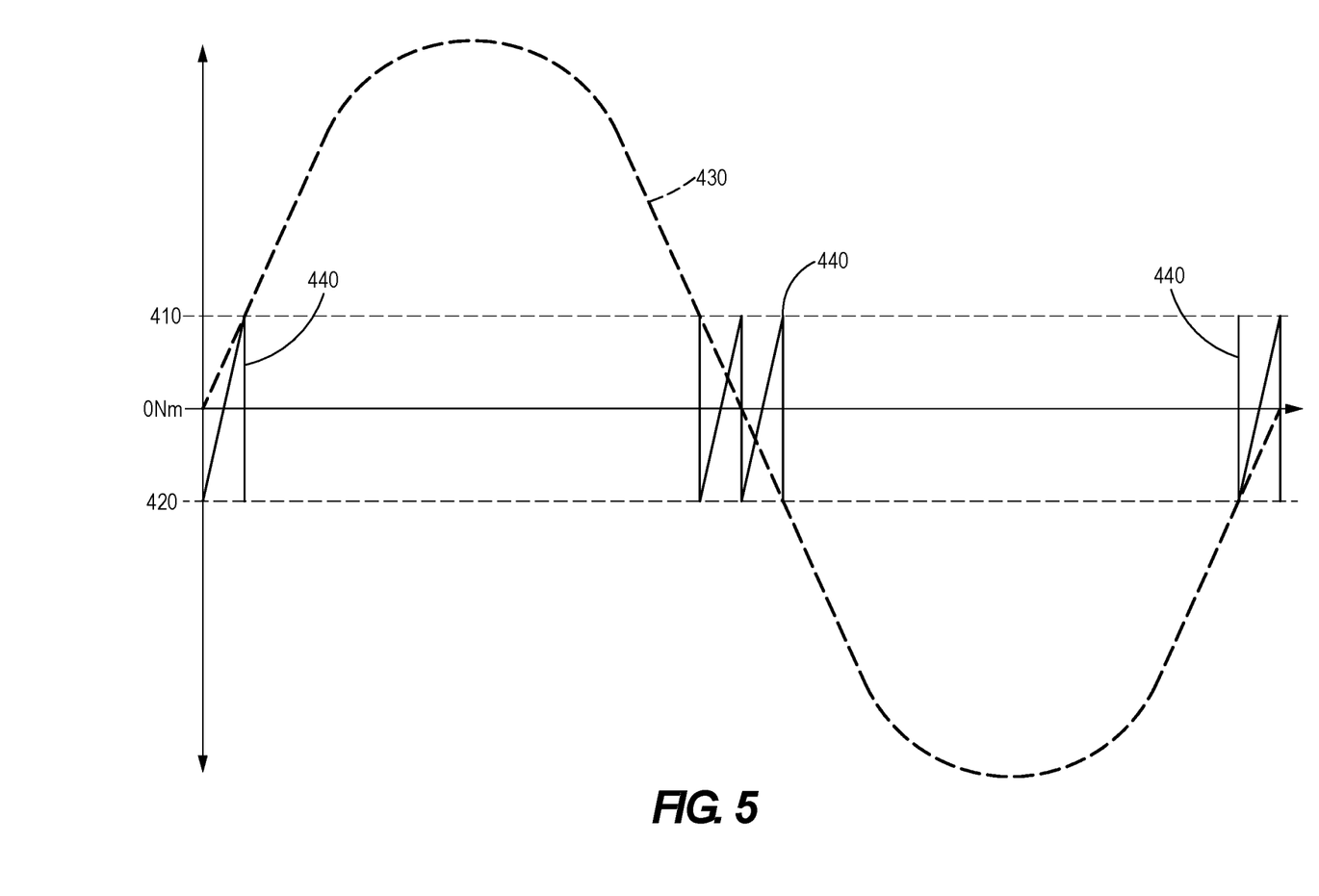
FIG. 5 is a torque command chart with pulse width modulation, according to one aspect of the present disclosure.

As discussed previously, the PWM adjusted torque command 450 is only produced when the desired torque 430 is between the threshold levels. FIG. 5 depicts a typical situation in which the desired torque 430 forms a sine wave. The PWM adjusted torque command 450 applies only in a narrow range as the torque approaches 0 N·m.

Industrial Applicability

Figure 6:
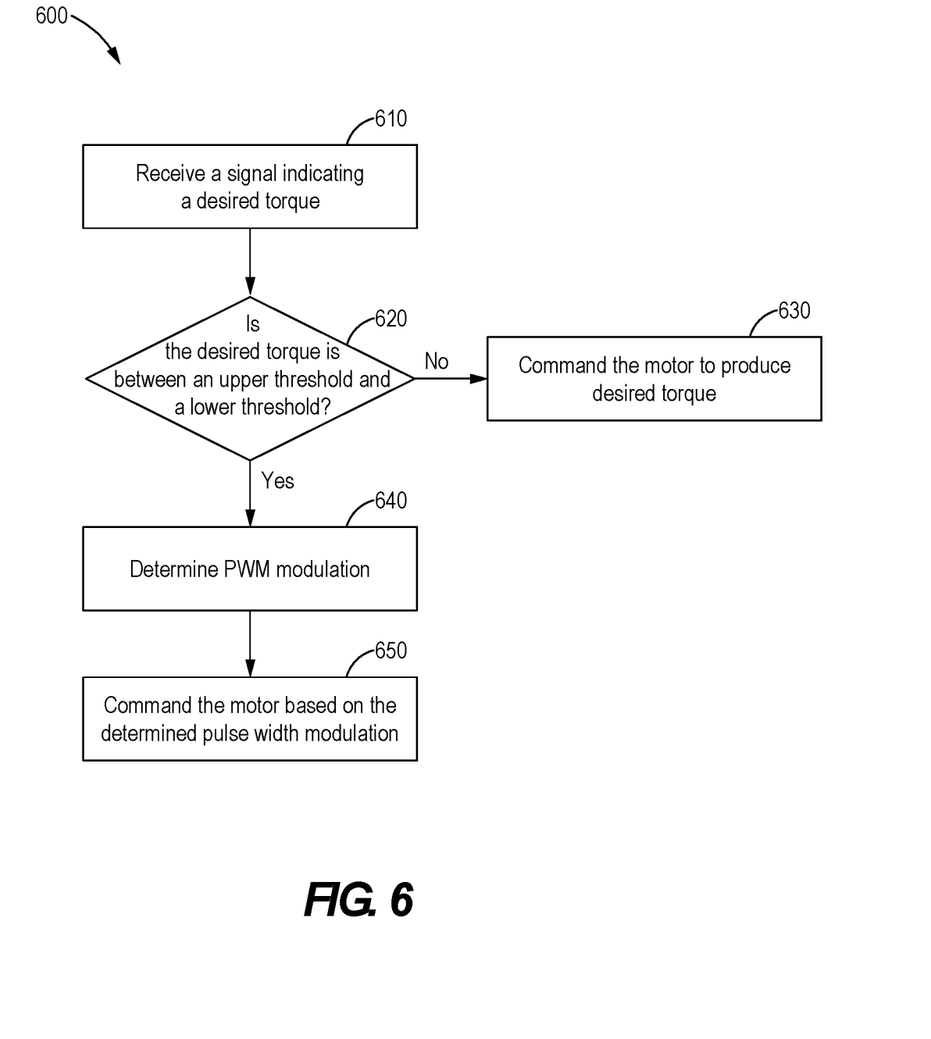
FIG. 6 is a flow chart for a method of overcoming a dead-band, according to one aspect of the present disclosure.

In general, the present disclosure finds application in many different industries, including, but not limited to, earth moving equipment, construction, agriculture, mining, and the like. More specifically, the dead-band-free sensor-less operation disclosed here is important for various applications due to the need for minimum package size, high reliability and low cost for SR work machine driven actuators. Reliable and accurate position sensing for switched reluctance motors is a key step towards developing low-cost, high-performance SR work machine drives. At very low torque loads, the current required may be too low for the method to correctly function, creating a dead-band in which the control system does not function correctly. The present disclosure therefore sets forth a method of avoiding a sensor dead-band in a switched reluctance motor. As shown in FIG. 6 and discussed in further detail below, the present method may be used to correct for this dead-band in any SR motor with sensor-less operation in a wide variety of work machines and applications. These may include track-type tractors, excavators, graders and any other electrically driven work machines 100 that may utilize a SR motor 205. Furthermore, the same method may also be applied to other dead-bands in electric machines, including, but not limited to, SR generators, SR motors with position sensors, induction motors, permanent magnet motors, and other electric machines including motors or generators.

Turning now to FIG. 6, the method 600 first requires receiving a signal indicating a desired torque 430, as shown in block 610. The controller 210 may receive the signal from other systems of the work machine 100 or an operator input. Next, the controller 210 determines if the desired torque 430 is between an upper threshold 410 and a lower threshold 420, as shown in block 620. The upper threshold 410 and the lower threshold 420 correspond to the dead-band limits of the sensor-less operation. If the desired torque is not within between the upper threshold 410 and the lower threshold 420, the controller 210 commands the SR motor 205 to produce the desired torque as normal (block 630).

On the other hand, if the desired torque 430 is between the upper threshold 410 and the lower threshold 420, the controller uses pulse width modulation to produce a PWM adjusted torque command 450 (block 640) and commands the SR motor 205 based on the PWM adjusted torque command 450, as shown in block 650. The PWM adjusted torque command 450 is configured to cycle between the upper threshold 410 and the lower threshold 420 to produce the desired torque 430.

The PWM adjusted torque command 450 may be produced by generating a PWM reference signal 440 and comparing that signal to the desired torque 430. The PWM reference signal 450 may be a sawtooth or triangle wave and oscillate between the upper threshold 410 and the lower threshold 420. The frequency of the reference signal must be faster than the mechanics can respond, but not so fast as to interfere with the position sensing system.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A work machine, comprising
a frame;
a traction system supporting the frame;
a power source mounted on the frame;
a switched reluctance motor;
an inverter configured to control power to the motor from the power source; and
a controller configured to:
    receive a desired torque command signal indicating a desired torque,
    determine if the desired torque is between an upper threshold and a lower threshold which corresponds to a positive and a negative torque load which produce a minimum current,
    use pulse width modulation to produce a PWM adjusted torque command if the desired torque is between the upper threshold and the lower threshold, the PWM adjusted torque command being configured to cycle between the upper threshold and the lower threshold to produce the desired torque, and
    command the motor based on the PWM adjusted torque command.

2. The work machine of claim 1, wherein the PWM adjusted torque command is produced by generating a PWM reference signal and comparing that signal to the desired torque.

3. The work machine of claim 2, wherein the PWM reference signal is a sawtooth wave.

4. The work machine of claim 1, wherein the minimum current is required for sensor-less operation of the switched reluctance motor.

5. The work machine of claim 1, wherein the upper threshold is 250 N·m and the lower threshold is −250 N·m.

6. The work machine of claim 1, wherein the desired torque creates a sine wave.

7. An electric drive system for a work machine, comprising:
 a switched reluctance motor;
 an inverter configured to control power to the motor from a power source; and
 a controller configured to:
  receive a desired torque command signal indicating a desired torque,
  determine if the desired torque is between an upper threshold and a lower threshold,
  use pulse width modulation to produce a PWM adjusted torque command if the desired torque is between the upper threshold and the lower threshold, the PWM adjusted torque command being configured to cycle between the upper threshold and the lower threshold to produce the desired torque,
  wherein the PWM adjusted torque command is produced by generating a PWM reference signal and comparing that signal to the desired torque, and
  command the motor based on the PWM adjusted torque command.

8. The system of claim 7, wherein the PWM reference signal is a sawtooth wave.

9. The system of claim 7, wherein the PWM reference signal has a frequency of 500 Hz.

10. The system of claim 7, wherein the upper threshold and a lower threshold correspond to a positive and a negative torque load which produce a minimum current.

11. The system of claim 7, wherein the upper threshold is 250 N·m and the lower threshold is −250 N·m.

12. The system of claim 7, wherein the desired torque creates a sine wave.

13. A method of overcoming a dead-band in a switched reluctance motor, comprising:
 receiving a desired torque command signal indicating a desired torque;
 determining if the desired torque is between an upper threshold and a lower threshold which correspond to a positive and a negative torque load which produce a minimum current required for sensor-less operation of the switched reluctance motor;
 using pulse width modulation to produce a PWM adjusted torque command if the desired torque is between the upper threshold and the lower threshold, the PWM adjusted torque command being configured to cycle between the upper threshold and the lower threshold to produce the desired torque; and
 commanding the motor based on the PWM adjusted torque command.

14. The method of claim 13, wherein the PWM adjusted torque command is produced by generating a PWM reference signal and comparing that signal to the desired torque.

15. The method of claim 14, wherein the PWM reference signal is a sawtooth wave.

16. The method of claim 14, wherein the PWM reference signal has a frequency of 500 Hz.

17. The method of claim 13, wherein the upper threshold is 250 N·m and the lower threshold is −250 N·m.

18. The method of claim 13, wherein the desired torque creates a sine wave.

* * * * *